United States Patent
Yamazaki

(10) Patent No.: US 8,254,237 B2
(45) Date of Patent: Aug. 28, 2012

(54) DIFFRACTION GRATING, OPTICAL PICKUP DEVICE AND OPTICAL DISC APPARATUS

(75) Inventor: Kazuyoshi Yamazaki, Kawasaki (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 13/082,507

(22) Filed: Apr. 8, 2011

(65) Prior Publication Data

US 2011/0214138 A1    Sep. 1, 2011

Related U.S. Application Data

(63) Continuation of application No. 12/356,801, filed on Jan. 21, 2009, now Pat. No. 7,948,841.

(30) Foreign Application Priority Data

Jan. 21, 2008   (JP) ................................. 2008-009985

(51) Int. Cl.
*G11B 7/00*    (2006.01)
(52) U.S. Cl. ............. 369/112.01; 369/44.41; 369/44.23; 369/53.19
(58) Field of Classification Search .................. None
See application file for complete search history.

(56) References Cited

U.S. PATENT DOCUMENTS

| | | | |
|---|---|---|---|
| 6,707,773 B2 | 3/2004 | Katayama | |
| 8,054,731 B2 * | 11/2011 | Kawasaki et al. | 369/112.01 |
| 2001/0036137 A1 | 11/2001 | Katayama | |
| 2005/0007932 A1 | 1/2005 | Ishika | |
| 2005/0276202 A1 * | 12/2005 | Sano et al. | 369/112.01 |
| 2008/0068944 A1 | 3/2008 | Kadowaki et al. | |

FOREIGN PATENT DOCUMENTS

| | | |
|---|---|---|
| JP | 2004-281026 | 10/2004 |
| JP | 2006-031913 | 2/2006 |
| JP | 2007-265595 | 10/2007 |

* cited by examiner

*Primary Examiner* — Van Chow
(74) *Attorney, Agent, or Firm* — Antonelli, Terry, Stout & Kraus, LLP.

(57) ABSTRACT

An optical pickup device includes a semiconductor laser which emits a light beam, first and second objective lenses which focus the light beam onto a first and second optical disc, respectively, a grating which branches a light beam reflected from the second optical disc, an optical detector having a plurality of light receiving parts, which receives light beams branched by the grating, and an actuator which displaces the first and second objective lenses in a radial direction of the first optical disc and the second optical disc. The grating has a first area on which a 0-order diffraction light beam and a +1-order diffraction light beam upon reflection at the second optical disc enter, and a second area on which a 0-order diffraction light beam and a −1-order diffraction light beam upon diffraction through the second optical disc enter.

4 Claims, 14 Drawing Sheets

+

DIFFRACTION GRATING, OPTICAL PICKUP DEVICE AND OPTICAL DISC APPARATUS

CROSS REFERENCE TO RELATED APPLICATION

This application is a continuation of U.S. application Ser. No. 12/356,801, filed Jan. 21, 2009, now U.S. Pat. No. 7,948,841, the contents of which are incorporated herein by reference.

INCORPORATION BY REFERENCE

The present application claims priority from Japanese application JP2008-009985 filed on Jan. 21, 2008, the content of which is hereby incorporated by reference into this application.

BACKGROUND OF THE INVENTION

The present invention relates to a diffraction grating, an optical disc pickup device and an optical disc apparatus.

There have been issued, for instance, Patent Document 1 (JP-A-2004-281026) and Patent Document 2 (JP-A-2006-31913) as background technologies in the field of art according to the present invention.

The Patent Document 1 (JP-A-2006-31913) discusses therein, in view of its task, "A variation in the amplitude of a TE signal is defined to ΔPP=(Amplitude a−Amplitude b)/(Amplitude a+Amplitude b), and in the case of detection of a TE signal in the above-mentioned conventional configuration, there are exhibit large values, that is, a variation value APP is 0.69 while a deviation Oft1 is +33 nm and a deviation Oft2 is −33 nm. In this case, should the variation value ΔPP in the amplitude of the TE signal be excessively large, the gain of tracking control would be lowered on tracks Tn−1, Tn, that is, the tracking control would be unstable. Thus, there has been raised the problem that data cannot be recorded or reproduced with a high degree of reliability", and proposes as solving measures "A further another optical data apparatus according to the present invention, comprises a light source for emitting an optical beam, a light focusing means for focusing an optical beam emitted from the light source onto an optical recording medium having tracks, a branching means for branching the optical beam reflected on and refracted by the optical recording medium, a splitting means for splitting the thus branched beam by a plurality of areas, a light detecting means having a plurality of detecting areas, for detecting light beams split by the splitting means so as to deliver current signals depending upon thus detected light quantities, a plurality optical conversion means for converting the current signals delivered from the light detecting means, into voltage signals, the plurality area arranged in the splitting means comprising a first area mainly including tracking error signal components, and a second area mainly including offset components of the tracking error signal components, and a tracking error signal producing means for producing a tracking error signal by subtracting from a voltage signal obtained in the first area, a value obtained by multiplying a voltage signal obtained in the second area with a coefficient, characterized in that the efficiency of the light beam passing through the second area and transmitted to the light detecting means is high in comparison with that of the light beam passing through the first area and transmitted to the light detecting means".

BRIEF SUMMARY OF THE INVENTION

An optical pickup device for exactly casting a spot onto a predetermined recording track located in general in an optical disc, detects a focus error signal so as to displace an objective lens in a focusing direction in order to carry out adjustment in the focusing direction, and also detects a tracking error signal so as to displace the objective lens in a radial direction of the disc-like recording medium in order to carry out tracking adjustment. With the use of these signals, the position of the objective lens is controlled.

Inter alia, a push-pull method tracking signal detecting process has been well-known as the tracking error signal detecting process. However, this process causes the problem that a large d.c. variation likely occurs (which will be hereinbelow referred to "DC-offset") due to a displacement of the objective lens in the driving direction of the optical pickup device. Thus, in the Patent Document 1, a light beam which mainly contains a tracking component and a light beam which does not contain a tracking component, are separately detected with the use of the splitting means, and are both subjected to differential computation for detecting a tracking error signal having a restrained DC-offset. By the way, should a variation in relative tracking angle be found in dependence upon a scanning radial position of the disc, a tracking component would be detected in an area where a tracking component is inherently corrected, causing the differential computation to decrease the tracking component in part, resulting in the problem that the gain of tracking control becomes lower, and accordingly, stable tracking control cannot be carried out.

The present invention has been devised in view of the above-mentioned circumstances, and accordingly, an object of the present invention is to provide an optical pickup device capable of obtaining stable servo signals, and an optical disc apparatus incorporating thereof.

The above-mentioned object can be achieved by the inventions stated in the appended claims.

A typical one of the inventions disclosed by the present application will be hereinbelow briefly explained in summary as follows.

According to the present invention, there is provided an optical pickup device comprising one or more semiconductor lasers for emitting a laser beam, a first objective lens for focusing the light beam emitted from the semiconductor lasers onto a first optical disc, a second objective lens for focusing the light beam emitted from the semiconductor lasers onto a second optical disc, a grating for branching a light beam reflected from the second optical disc, an optical detector having a plurality of light receiving parts for receiving light beams branched by the grating, and an actuator for displacing the first and second objective lenses in a radial direction of the first optical disc, wherein the first and second objective lenses are arranged to be lined up in a direction substantially perpendicular to the displacement direction of the actuator, the first objective lens having its lens center which is located on an axis extending from the center of the first optical disc in the displacement direction, the grating having six areas comprising an area 1, an area 2, an area 3, an area 4, an area 5 and an area 6, the area 1 and the area 2 of the grating being point-symmetric to each other with respect to the center of the grating, the area 3 and the area 5 of the grating being point-symmetric to each other with respect to the center of the grating, and the area 4 and the area 6 being symmetric to each other with respect to the center of the grating, the area 1 of the grating being interposed between the area 3 and the area 6, the area 2 of the grating being interposed between the area 4 and the area 5, and the center parts of the area 1 and the area 2 of the grating are arranged being spaced from each other by a distance d in a direction perpendicular to the displacement direction.

In view of the configuration according to the present invention, there can be provided the optical pickup device in which the objective lenses can obtain a stable servo signal even though the rotating center of a disc is not located on a straight line in the displacement direction of the optical pickup device, and an optical disc apparatus incorporating thereof.

BRIEF DESCRIPTION OF THE SEVERAL VIEWS OF THE DRAWING

These and other features, objects and advantages of the present invention will become apparent from the following description when taken in conjunction with the accompanying drawings wherein.

DETAILED DESCRIPTION OF THE INVENTION

Explanation will be hereinbelow made of preferred embodiments of the present invention with reference to the accompanying drawings.

[Embodiment 1]

Figure 1:
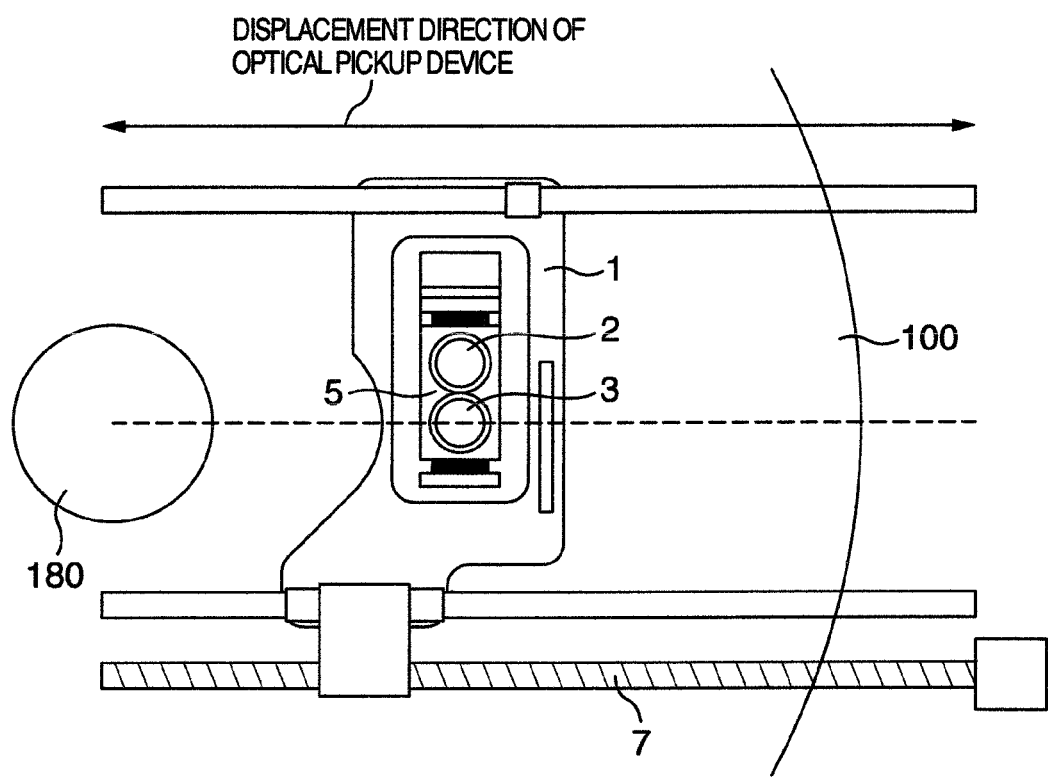
FIG. 1 is a view for explaining the arrangement of an optical pickup device and an optical disc apparatus in an embodiment 1.

FIG. 1 shows an example of an optical pickup device in a first embodiment of the present invention.

The optical pickup device 1 can be driven in a radial direction of an optical disc 100 by means of a drive mechanism 7. Further, an actuator 5 on the optical pickup device carries thereon an objective lens 2 and an objective lens 3. The rotating center of the disc 100 is located in a straight line in a driving direction of the optical pickup device for the objective lens 3 but is not located on a straight line in a driving direction of the optical pickup device for the objective lens 2.

The objective lenses 3 and 2 in this embodiment will be explained, for example, as a DVD/CD objective lens, and a BD objective lens, respectively.

Figure 2:
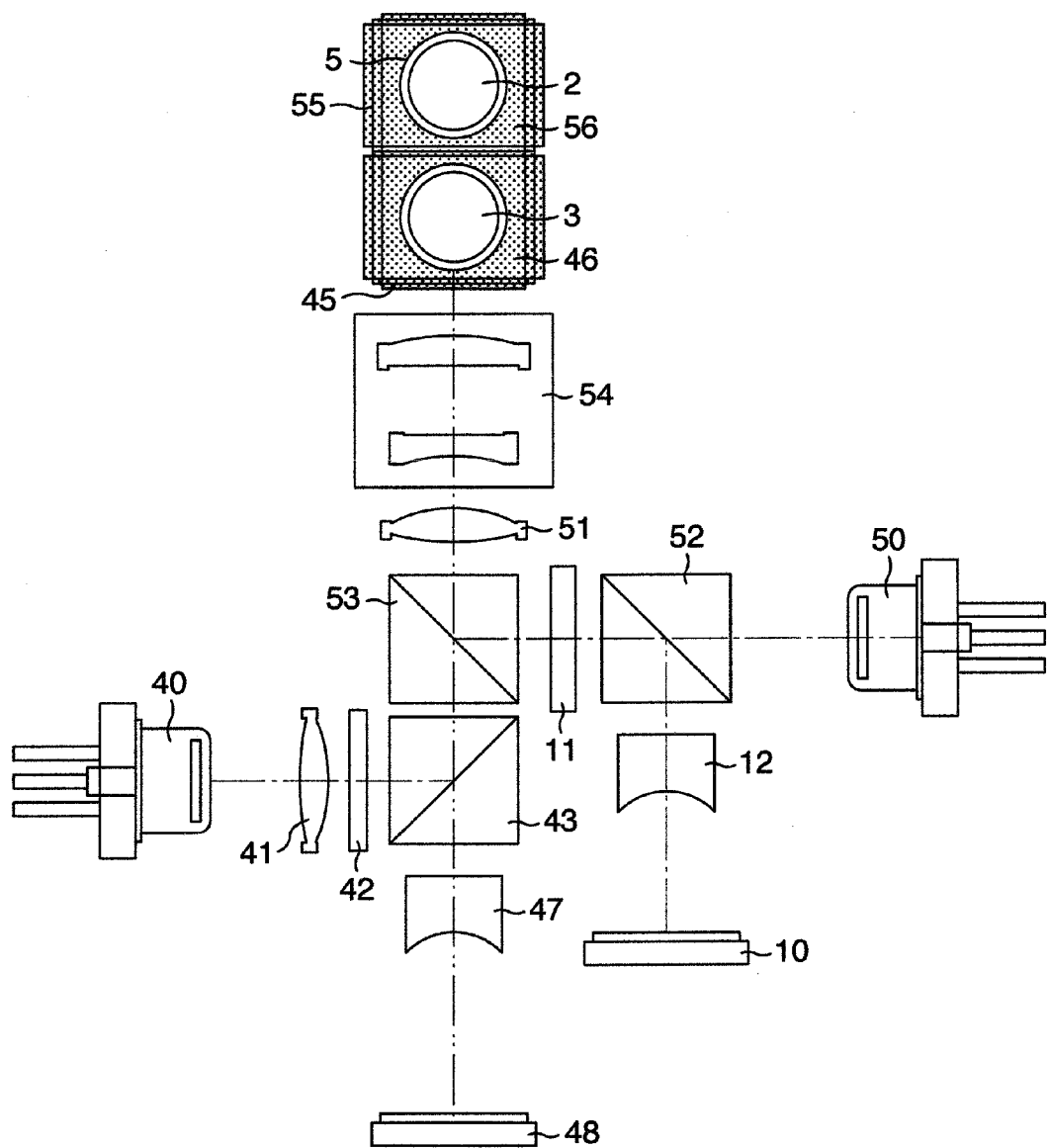
FIG. 2 is a view for explaining an optical system in the embodiment 1.

FIG. 2 shows an optical system in the optical pickup device as stated above. At first, explanation will be made of a DVD/CD optical system. A dual wavelength semiconductor lens 40 emits a light beam having a wavelength of about 650 nm and a light beam having a wavelength of about 785 nm as divergent light beams. A light beam emitted from the semiconductor laser 40 is transmitted through an auxiliary lens 41, a grating 42, and is then reflected by a beam splitter 43 from which the light beam is transmitted through the beam splitter 53, and is converted into a substantially parallel ray light beam, being passed through a collimator lens 51 from which the beam is transmitted through a beam expander 54, a mirror 45, a ¼ wavelength plate 46, and is then focused onto an optical disc 100 by means of the objective lens 3 mounted on the actuator 5.

A light beam reflected from the optical disc 100 is transmitted through the objective lens 3, the ¼0 wavelength plate 46, the mirror 45, the beam expander 54, the collimator lens 51, the beam splitter 53 and the beam splitter 43, and is thereafter detected by an optical detector 48 by way of a detection lens 47. The same is said for a CD, and accordingly, explanation thereto will be omitted.

Next, explanation will be made of a BD optical system. A semiconductor laser 50 emits a light beam having a wavelength of about 405 nm as a divergent light beam, which is then transmitted through a beam splitter 52, a polarizing grating 11 (which will be hereinbelow referred to as "grating"), and is then reflected upon the beam splitter 53.

The light beam reflected from the beam splitter 53 is led through the collimator lens 51 so as to be converted into a substantially parallel ray light beam which is then incident upon the beam expander 54. The beam expander 54 which is adapted to change a divergent/convergent condition of a light beam, is used for compensation for spherical aberration due to a tolerance error in the thickness of a cover layer of an optical disc 100. The light beam emerged from the beam expander 54 is transmitted through the mirror 45, is then reflected upon a mirror 55, and is finally focused onto the optical disc 100 by means of the objective lens 2 mounted on the actuator 5 after being transmitted through the ¼ wavelength plate 56.

A light beam reflected from the optical disc 100 is transmitted through the objective lens 2, the ¼ wavelength plate 56, the mirror 55, the mirror 45, the beam expander 54, the collimator lens 51 and the beam splitter 53, and is then incident upon the grating 11 by which the light beam is split into a plurality of domains which are then advanced in different directions and are incident upon a detection lens 12 for subjecting the light beam to astigmatism before it is incident upon an optical detector 10. Thus, a focus error signal is detected by an astigmatic process. As shown, for example, in FIG. 3, the optical detector 10 is formed thereon with a plurality of light receiving parts upon which optical beams split by the grating 11 are respectively irradiated. Thus, electrical signals are outputted from the optical detector 10, depending upon quantities of the light beams received by the light receiving parts. The output signals are then computed so as to generate an RF signal as a reproducing signal, a focus error signal and a tracking error signal.

With this configuration, should the grating 11 have a pattern as, for example, disclosed in the Patent Document 1, there would be caused the following problems.

Figure 4A:
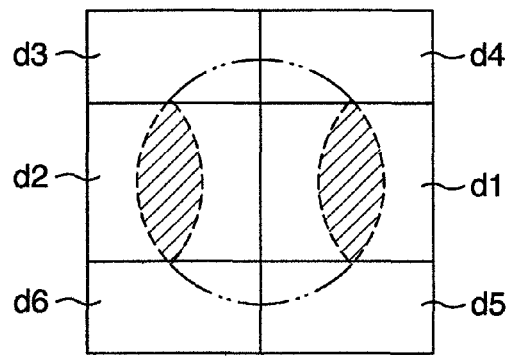
FIGS. 4A and B are views for explaining a tracking error signal detecting system disclosed in Patent Document 1.
Figure 4B:
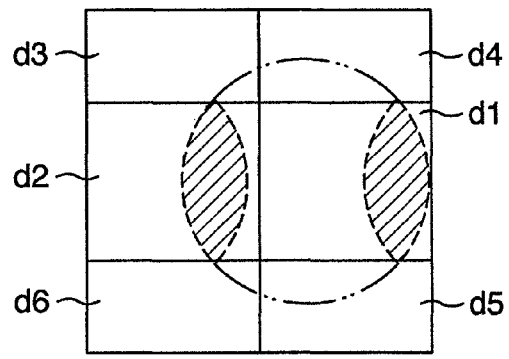

At first, explanation will be made of a method of detecting a tracking error signal, disclosed in the Patent Document 1. Interference ranges between a 0-order light beam and ±1-order light beams which have been reflected upon a track on the optical disc 100 are detected, and are them subjected to differential computation so as to generate a tracking component. FIGS. 4A and B show relationships between the grating disclosed in the Patent Document 1 and the optical beams. In particular, FIG. 4A shows the relationship in the case that the objective lens is not displaced while FIG. 4B shows the relationship in the case that the objective lens is displaced. The solid lines indicated in the figures exhibit split lines of the grating, and the two-dot-chain line exhibits a light beam on the grating while shaded parts exhibit tracking areas.

Figure 3:
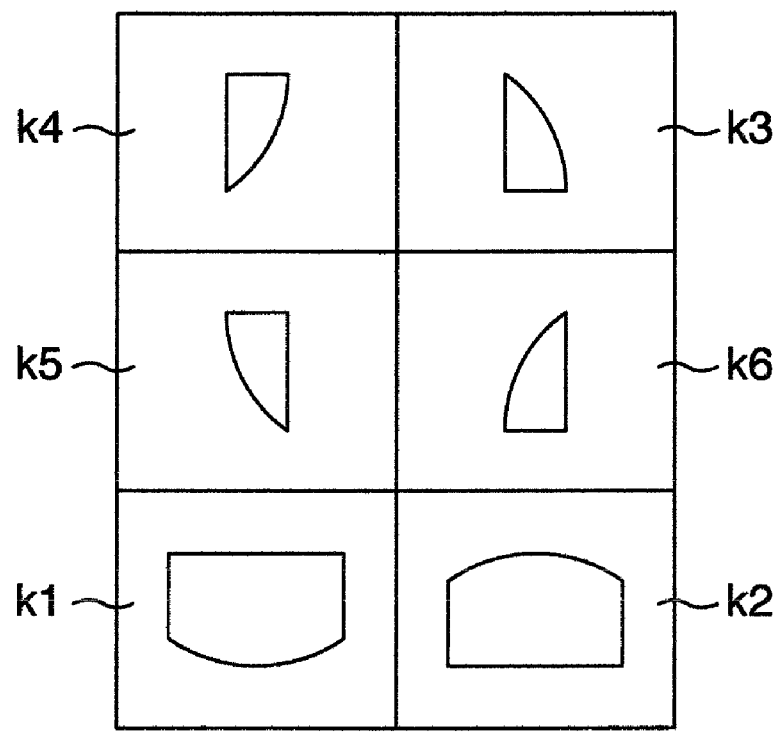
FIG. 3 is a view for explaining an optical detector in the embodiment 1 of the present invention.
Figure 3:
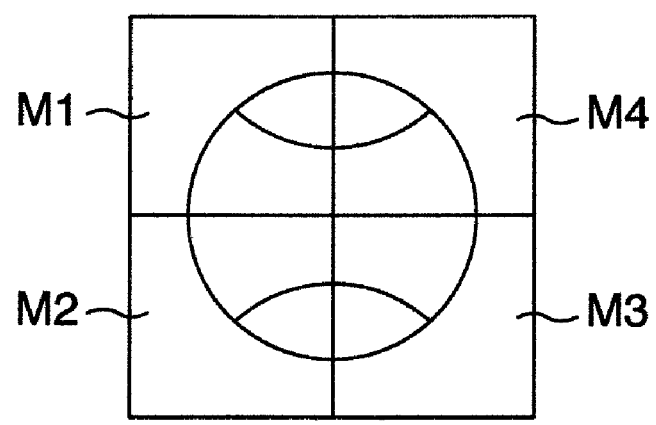

It is noted that light beams which have been diffracted by the areas d1, d2, d3, d4, d5, d6 of the grating are incident upon light receiving parts k1, k2, k3, k4, k5, k6 of the light detector shown in FIG. 3, respectively. Further, the light beams which have passed through the grating, are incident upon light receiving parts M1, M2, M3, M4. A focus error signal, a tracking error signal and an RF signal can be obtained from electric signals D1, D2, D3, D4, D5, D6, A, B, C, D which are delivered respectively from the light receiving parts k1, k2, k3, k4, k5, k6, M1, M2, M3, M4 with the use of the following formulae.

$$FES=(M1+M3)-(M2+M4)$$

$$TES=(D1-D2)-kt\times\{(D4-D3)+(D5-D6)\}$$

$$RF=M1+M2+M3+M4$$

where kt is a coefficient which can prevent occurrence of a DC component in a tracking error signal in the case of displacement of the objective lens.

Since tracking components are generated in tracking areas, a differential signal between D1 and D2 gives a tracking signal. However, if the objective lens is displaced in the driving direction of the optical pickup device in order to cause the spot on the disc to follow up a track, the optical beam is displaced on the grating as shown in FIG. 4B, a DC-offset occurs in the differential signal between D1, D2. In order to suppress the DC-offset, the signals D3, D4, D5, D6 are used. Since the signals D3, D4, D5, D6 do not substantially include tracking components, only the DC-offset is detected through the computation of (D3−D4)+(D5−D6). Thus, with the use of the above-mentioned computation, a stable tracking error signal can be obtained with no DC-offset.

Figure 5:
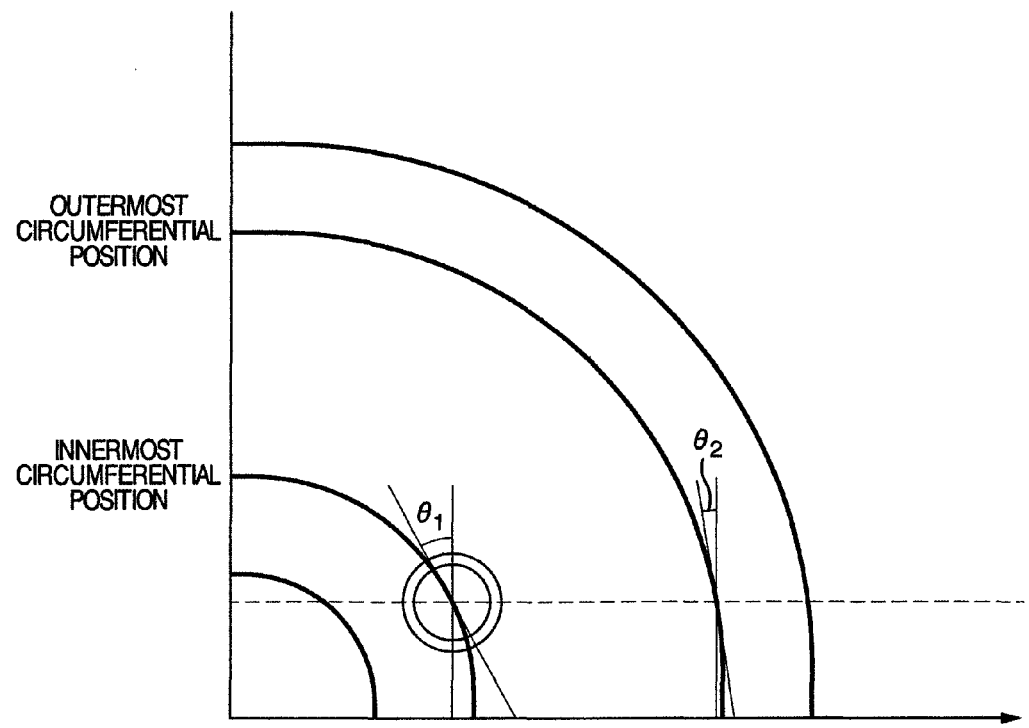
FIG. 5 is a view for explaining variations in tracking angle at inner and outer peripheral positions.
Figure 6:
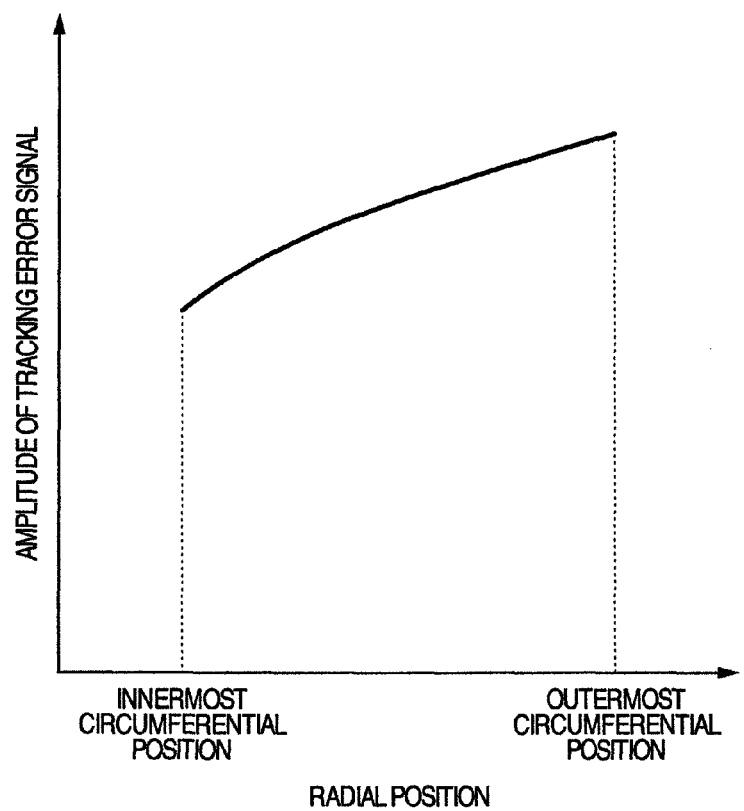
FIG. 6 is a view for explaining variations in amplitude of a tracking error signal at inner and outer circumferential positions of a disc in the configuration disclosed in Patent Document 1.

As shown in FIG. 2, in the configuration of the present invention, the rotating center of the optical disc 100 is not located on the straight line in the driving direction of the optical pickup device as to the objective lens 2, and accordingly, the tracking angle at an inner circumferential position is different from that at an outer circumferential position, as shown in FIG. 5. Should the configuration disclosed in the Patent Document 1 be used, as it is, the amplitude of the tracking error signal would vary, as shown in FIG. 6, depending upon a radial position of the optical disc. This variation will be hereinbelow explained.

Figure 7A:
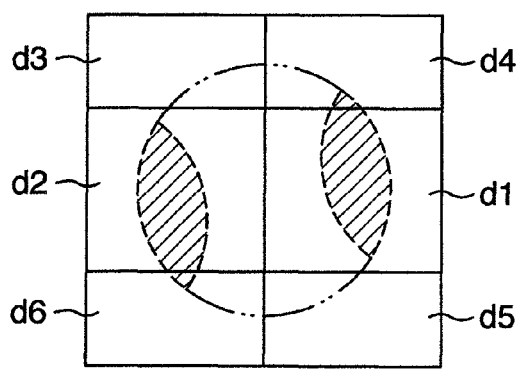
FIGS. 7A and B are views for explaining a task of the configuration disclosed in Patent Document 1.
Figure 7B:
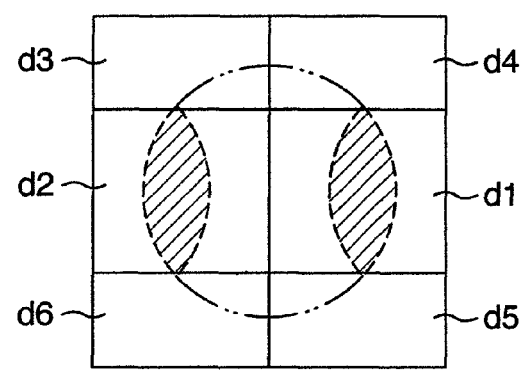

The tracking area is an interference area between the 0-order diffracted light beam and ±1-order refracted light beams upon reflection at a track on the disc as stated above. Thus, the tracking areas are rotated in association with the rotation of the track on the disc. FIGS. 7A and B show the relationships between the pattern of the grating and the optical beam at both inner and outer circumferential positions, that is, FIG. 7A shows the relationship at an inner circumferential position and while FIG. 7B shows the relationship at an outer circumferential position. The solid lines in the figures indicate the split lines of the grating, the tow-dot-chain line indicates the optical beam on the optical disc, and the shaded parts indicate the tracking areas. Thus, when the tracking areas are rotated, tracking components occurs in the electric signals D4, D6. Thus, the computation of the tracking error signal deteriorates the amplitude. Thus, the tracking error signal varies between an inner circumferential position and an outer circumferential position, as shown in FIG. 6. This variation deteriorates the gain of the tracking control, causing the tracking control to be unstable.

Figure 8:
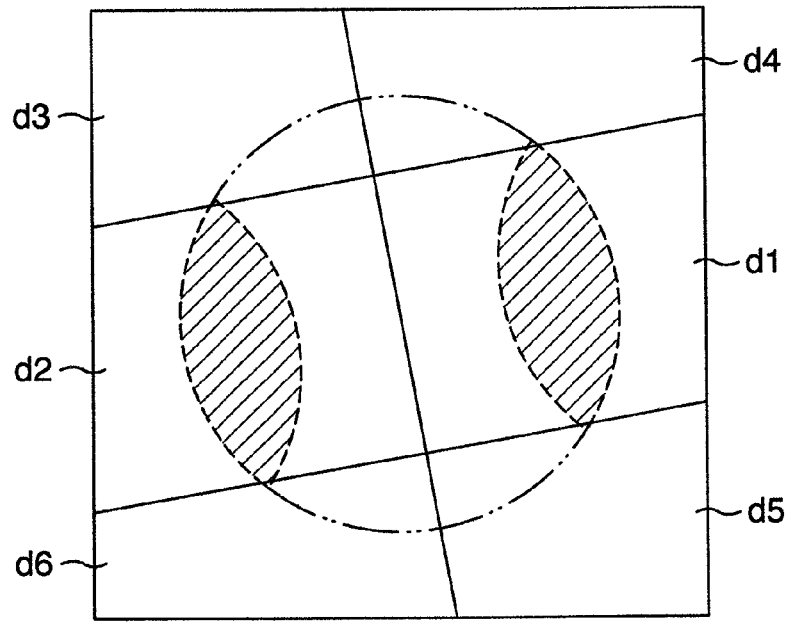
FIG. 8 is a view for explaining a tracking error signal detecting system disclosed in a patent Document 2.
Figure 9:
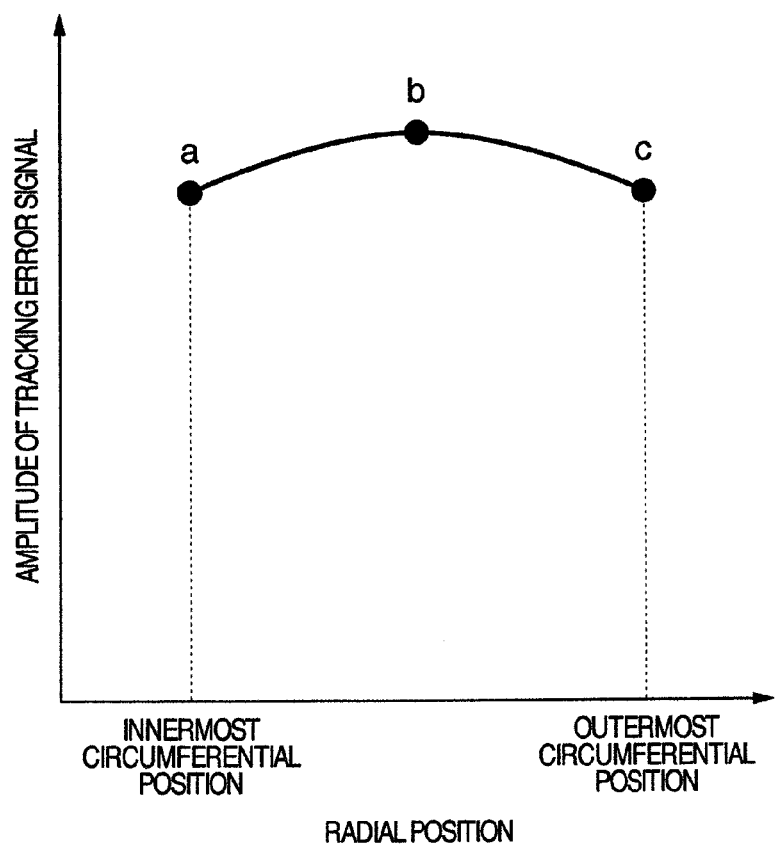
FIG. 9 is a view for explaining a variation in amplitude of a tracking signal error at inner and outer circumferential positions of a disc in the configuration disclosed in patent Document 2.

On the contrary, JP-A-2006-31913 (Patent Document 2) discloses the configuration that the splitting lines of the grating disclosed in the Patent Document 1 are turned, as shown in FIG. 8, in order to suppress the variation in the tracking error signal between an inner circumferential position and an outer circumferential position as shown in FIG. 9. However, similar problems could be caused even thought the grating is slanted, which will be explained hereinbelow.

Figure 10A:
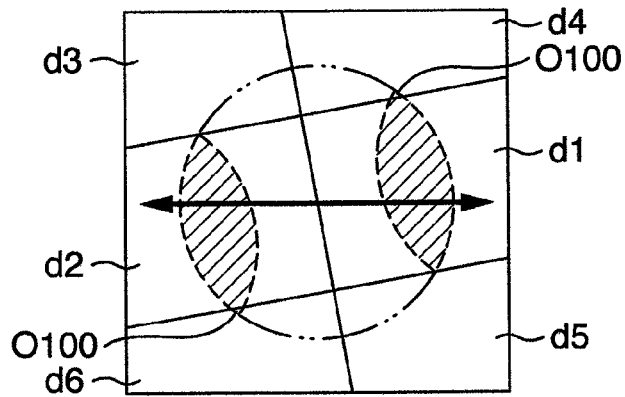
FIGS. 10A to C are views for explaining a task of the configuration disclosed in Patent Document 2.
Figure 10B:
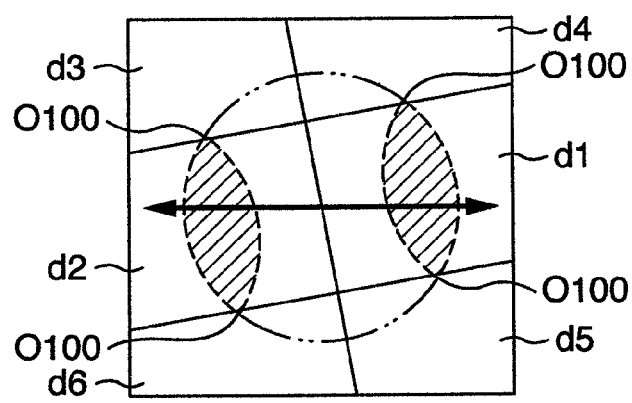
Figure 10C:
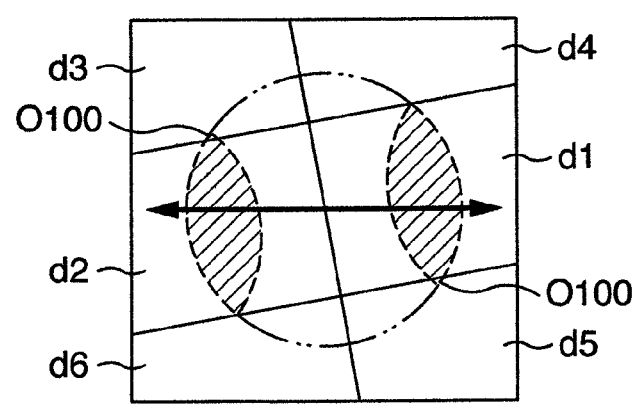

FIGS. 10A to C show the relationships between the optical beam and the grating at an inner circumferential position, a middle circumferential position and an outer circumferential position, that is, FIGS. 10A, B and C show respectively the relationships between the optical spot and the grating at points a, b, c shown in FIG. 9. In this case, since the tracking areas are incident upon the grating areas d3, d4, d5, d6, the spot is displaced from the point b to the point a or c, and accordingly, the amplitude of the tracking error signal varies. It is noted here that the grating is angled in comparison with the configuration disclosed in the Patent Document 1, and accordingly, the variation in the amplitude of the tracking error signal is reduced. However, when the objective lens 2 is displaced in the driving direction of the pickup device (indicated by the arrow shown in FIGS. 10A to C) in order allow the spot on the disc to follow up a track, the tracking areas are incident upon the grating areas d3, d4, d5, d6 (as indicated by the part O100 in FIG. 10C). As a result, tacking components further occur in the electrical signals D3, D4, D5, D6, and accordingly, the amplitude of the tracking error signal varies. Thus, there would be caused deterioration of the gain of the tracking control, resulting in unstable tracking control.

Figure 11:
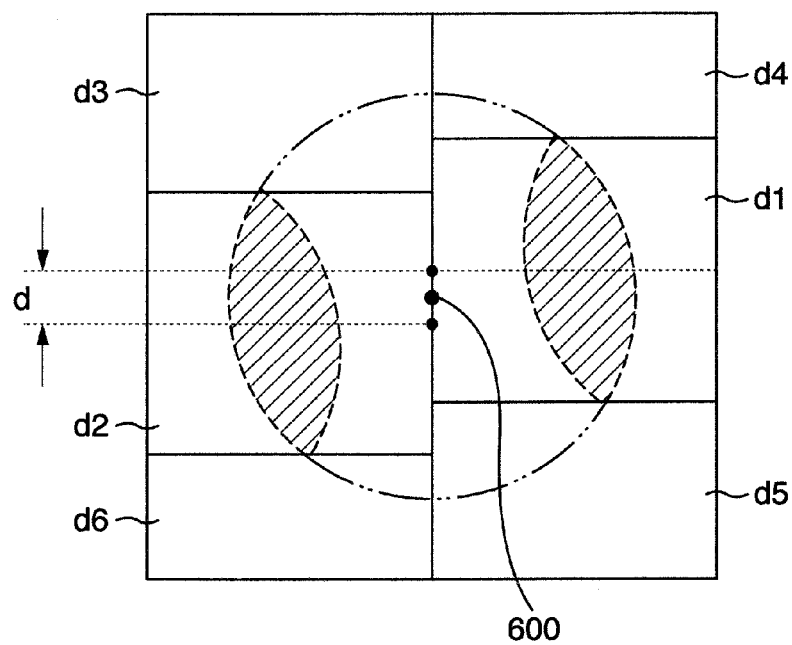
FIG. 11 is a view for explaining a grating in the embodiment 1 of the present invention.
Figure 12:
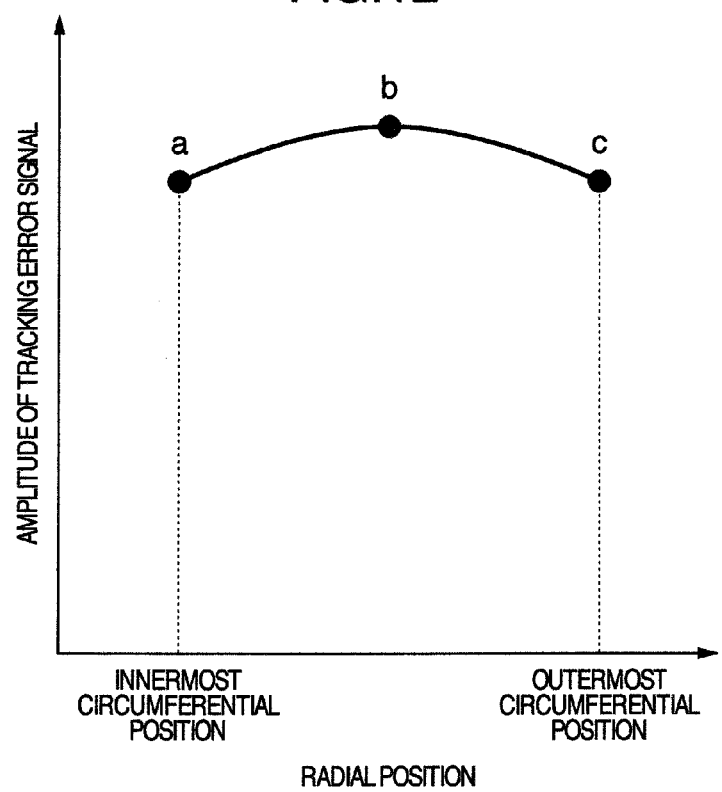
FIG. 12 is a view for explaining technical effects of the embodiment 1 of the present invention.

In view of this problem, in this embodiment, the grating shown in FIG. 11 is used as an example. The diffraction grating shown in this figure, has six grating areas d1 (first area), d2 (second area), d3 (third area), d4 (fourth area), d5 (fifth area) and d6 (six area), among which there are arranged, in point symmetry with respect the center 600 of the grating, d1 and d2, d3 and d5, and d4 and d6. Further, this grating has the feature that not only the areas of the grating are rotated simply as disclosed in the Patent Document 2, but also the centers of the areas d1, d2 are shifted by a distance d in a direction perpendicular to the driving direction of the optical pickup device. With this grating having the above-mentioned configuration, the variation in the amplitude of the tracking error signal can be suppressed from an inner circumferential position to an outer circumferential position, as shown in FIG. 12. Further, the grating according to the present invention has the feature that it is robust with respect to the displacement of a lens in comparison with the Patent Document 2.

Figure 13A:
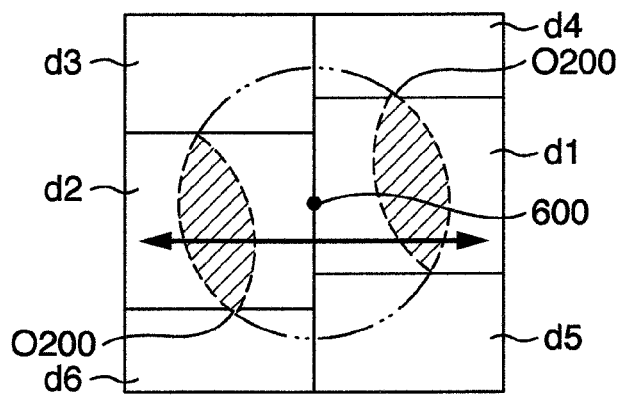
FIGS. 13A to C are views for explaining technical effects of the embodiment 1 of the present invention.
Figure 13B:
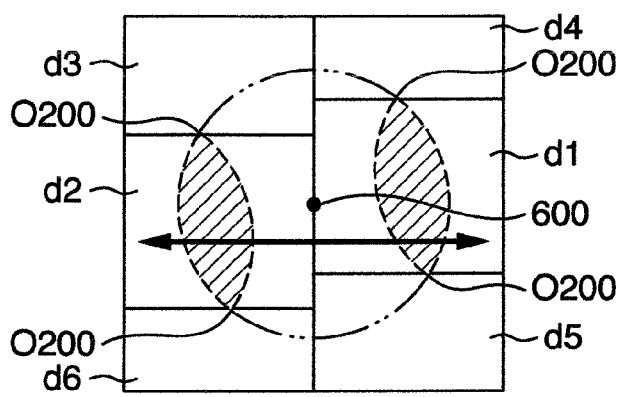
Figure 13C:
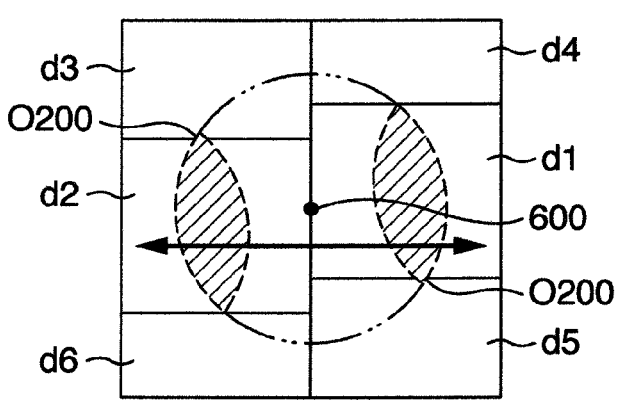

FIGS. 13A to C show relationships between the light beam and the grating at an inner circumferential position, a middle circumferential position and an outer circumferential position in this configuration of the present invention. FIGS. 13A, B and C show the relationships between the spot and the grating, at points a, b, c shown in FIG. 12. It is noted here that the tracking areas are incident upon the grating areas d3, d4, d5, d6 in the cases shown in FIGS. 13A and 13C, and accordingly, the amplitude of the tracking error signal varies when the spot is displaced from the point b to the point a or the point c. However, the positions of the grating areas d1, d2 are shifted in a direction perpendicular to the driving direction of the optical pickup device in comparison with the configuration disclosed in the Patent Document 1, thereby it is possible to reduce the degree of variation in the amplitude of the tracking error signal.

It is noted here that a part corresponding to o200 shown in FIGS. 13A to C is incident upon the grating areas d3, d4, d5, d6 as the objective lens is displaced, in the configuration disclosed in the Patent Document 2. On the contrary, according to the present invention, tracking areas incident upon the grating areas d3, d4, d5, d6 do not vary, even though the objective lens is displaced in the driving direction of the optical pickup device (refer to the arrow in FIG. 11) in order to cause the spot on the disc to follow up a track. This is because the areas of the grating are arranged in parallel with the direction of the displacement of the objective lens. Thus, a stable tracking error signal can be detected even though the objective lens is displaced. It is noted that the distance d as to the grating can be exhibited by the following formula:

$$D \times \sin \theta 1 \geq d \geq D \times \sin \theta 2$$

where θ1 and θ2 are shown in FIG. 5, and D is the effective diameter of the light beam.

That is, this distance d is effective between the degree (D×sin θ1) of variation of the tracking area in a direction perpendicular to the displacing direction of the objective lens, being caused by a slant θ1, and the degree (D×sin θ2) of variation of the tracking area in a direction perpendicular to the displacing direction of the objective lens, being caused by a slant θ2.

Figure 14A:
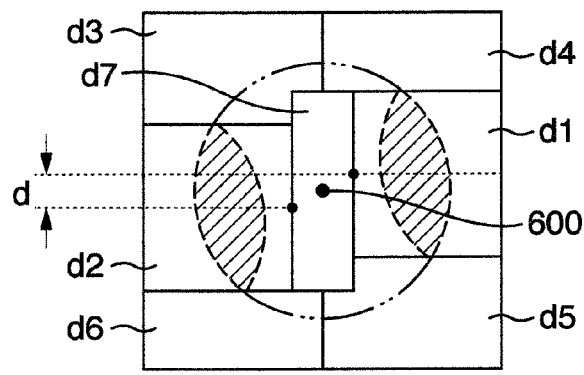
FIGS. 14A to C are views for explaining a grating other than that shown in FIG. 11.
Figure 14B:
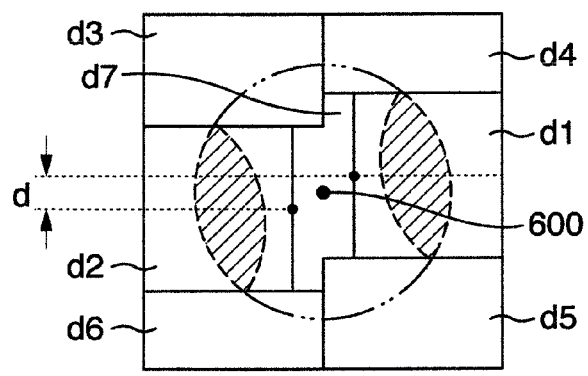
Figure 14C:
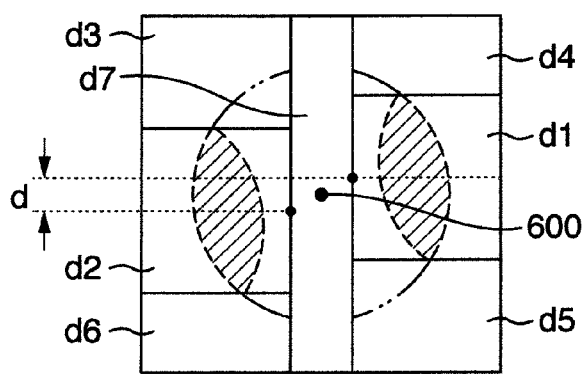

Thus, by shifting the gratins areas d1, d2 by the distance d in a direction perpendicular to the driving direction of the optical pickup device, it is possible to minimize the variation in the amplitude of the tracking error signal between an inner circumferential position and an outer circumferential position and the variation in the amplitude of the tracking error signal due to a displacement of the objective lens. Although explanation has been made of the configuration as shown in FIG. 11 in this embodiment, it is noted here that similar technical effects and advantages can be obtained if the grating areas for diffracting and detecting the tracking areas are shifted in the direction of the tracking area, and accordingly, the configuration of the grating may have, for example, a grating area d7 (seventh area), as shown in FIGS. 14A to C.

Further, in this embodiment, although explanation has been made of the focus error signal detecting system of an astigmatic method, it goes without saying that similar technical effects and advantages can be also obtained by using another method such as a knife-edge method or a spot size method, that is, the present invention do not depend upon any detection system or detector. Further, although explanation has been made of the grating 11 which is a polarization grating, in this embodiment, it goes without saying that, for example, a usual grating may be disposed between the beam splitter 21 and the detection lens 12.

[Embodiment 2]

Figure 15:
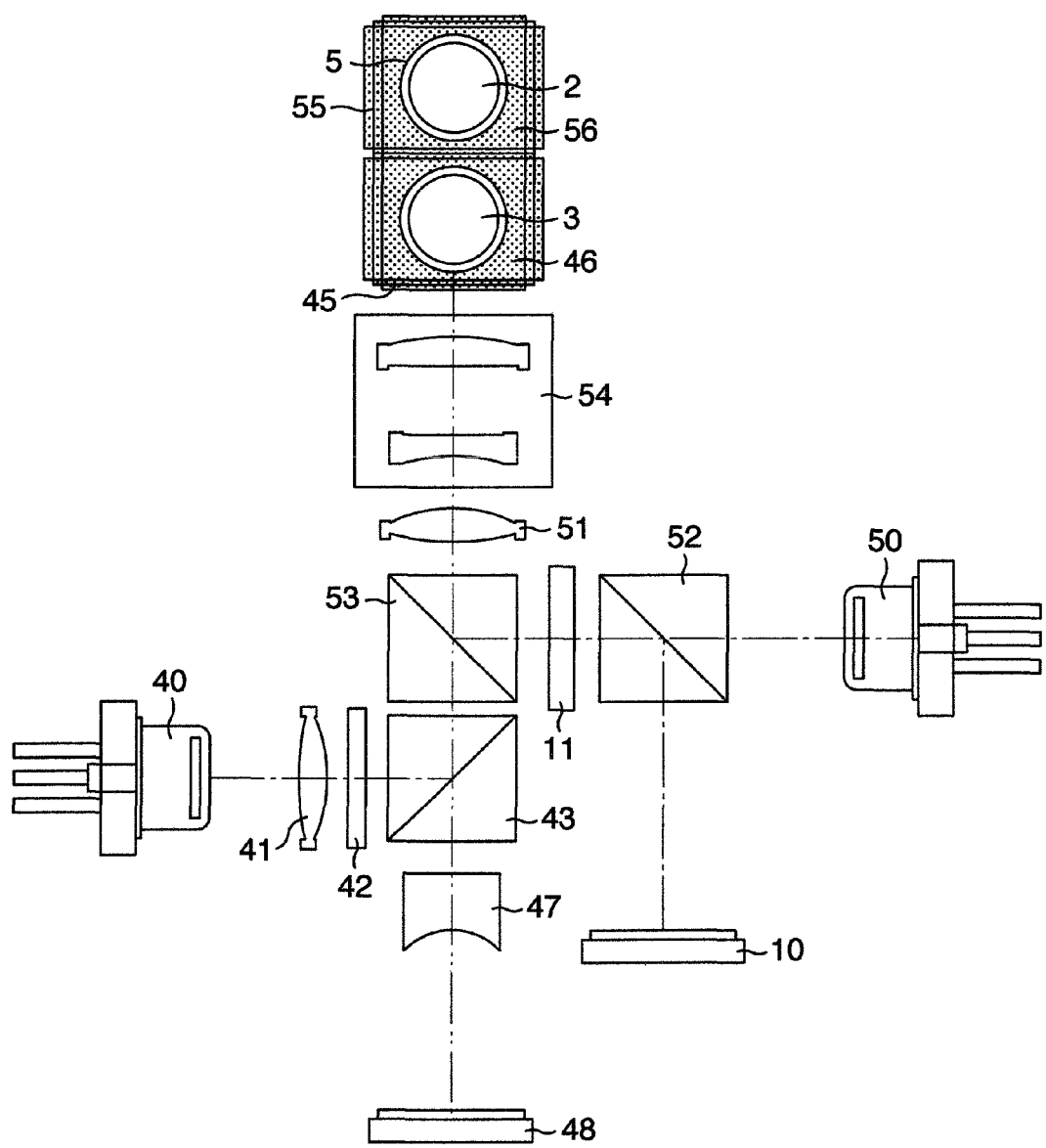
FIG. 15 is a view for explaining an optical system in an embodiment 2 of the present invention.

FIG. 15 shows an optical system as to an optical pickup device in a second embodiment of the present invention. It is noted that the DVD/CD optical system in this embodiment is similar to that in the embodiment 1, and accordingly, the explanation thereto will be omitted. Thus, explanation will be only made of a BD optical system having a configuration different from that of the embodiment 1.

The semiconductor laser 50 emits a light beam having a wavelength of about 405 nm as a divergent light beam. The light beam emitted from the semiconductor laser 50 is transmitted through the beam splitter 52, the polarizing grating 11 (which will be hereinbelow referred to as "grating"), and is then reflected by the beam splitter 53.

The light beam reflected from the beam splitter 53, is converted by the collimator lens 51 into a subtantially parallel ray light beam which is then incident upon the beam expander 54 that is adapted to be used for compensating a spherical aberration caused by a tolerance error in the thickness of a cover layer on the optical disc 100, by changing the divergent/convergent condition of the light beam. The light beam emerged from the beam expander 54 is transmitted through the mirror 45 while it is reflected upon the mirror 55, and after being transmitted through the ¼ wavelength plate 56, the light beam is focused onto the optical disc 100 by the objective lens 2 mounted on the actuator 5.

The light beam reflected from the optical disc 100 is transmitted through the objective lens 2, the ¼ wavelength plate 56, the mirror 55, the mirror 45, the beam expander 54, the collimator lens 51 and the beam splitter 53, and then is incident upon the grating 11. The light beam is split by the grating 11 into a plurality of domains which are then advanced in directions different from one another, and are incident upon the optical detector 10 on which a plurality of light receiving parts are formed. The optical beams split by the grating 11 are irradiated onto the respective light receiving parts, and electric signals are delivered from the optical detector 10 in accordance with light quantities irradiated onto the light receiving parts. These output signals are computed so as to generate an RF signal as a reproducing signal, a focus error signal and a tracking error signal.

Figure 16:
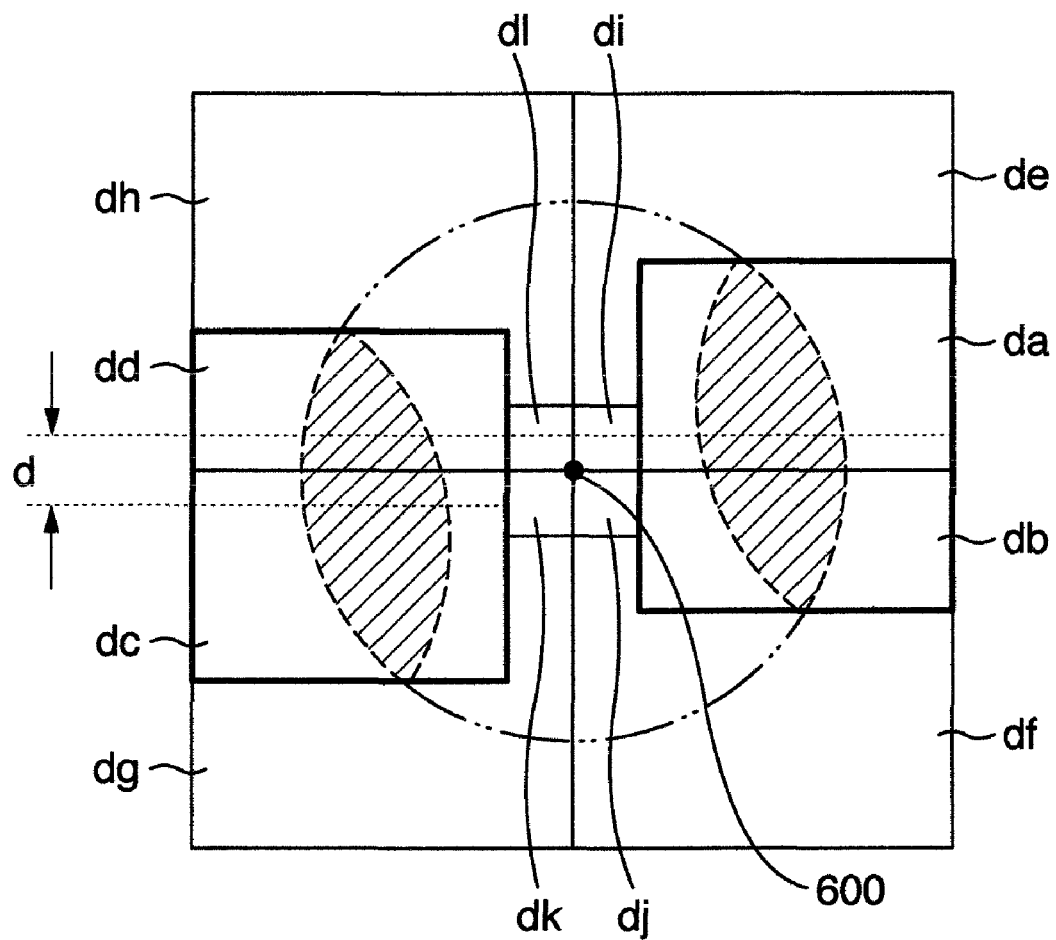
FIG. 16 is a view for explaining a grating in the embodiment 2 of the present invention.
Figure 17:
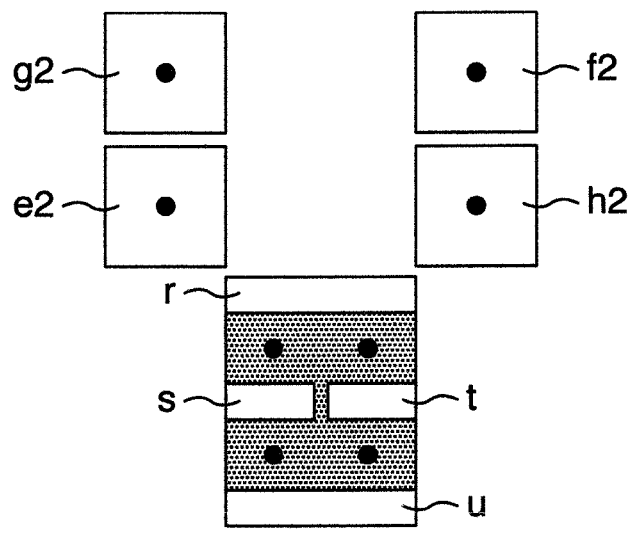
FIG. 17 is a view for explaining an optical detector in the embodiment 2 of the present invention.
Figure 17:
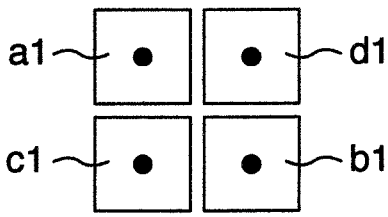
Figure 17:
Figure 17:
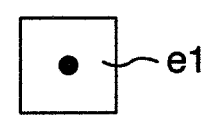
Figure 17:
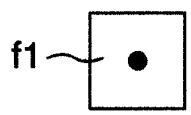
Figure 17:
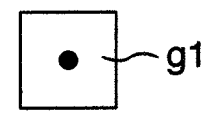
Figure 17:
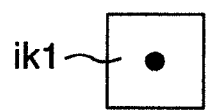
Figure 17:
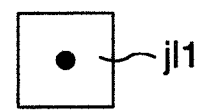

In the configuration of the optical system as stated above, the grating 11 is shown FIG. 16 while the detector 10 is shown in FIG. 17. The grating 11 comprises seven areas, that is, an area da and db (first area), an area dc and dd (second area), an area de (forth area), an area df (fifth area), an area dg (sixth area), an area dh (third area) and an area di, dj, dk and dl (seventh area), the area da, db and the area dc, dd, the area de and the area dg, the area df and area dh are respectively arranged in a point symmetry with respect to the center 600 of the grating. Of these grating areas, a +1-order light beams diffracted through the grating areas da, db, dc, dd, de, df, dg and dh, are incident respectively upon light receiving parts a1, b1, c1, d1, e1, f1, g1 and h1 shown in FIG. 17. Further, +1-order light beams diffracted through the areas di, dk are incident upon a light receiving part ik1 shown in FIG. 17, and +1-order light beams diffracted through the grating areas dj, dl are incident upon a light receiving part jl1 shown in FIG. 17. Further, −1-order light beam diffracted through the grazing areas da, db, dc, dd are incident respectively upon light receiving parts r, s, t, u while −1-order light beams diffracted through the grating areas de, df, dg, dh are incident respectively upon light receiving parts e2, f2, g2, h2. It is noted that the grating areas i1, j1, k1, l1 are blazed so as to generate only +1-order light beams.

The focus error signal, the tracking error signal and the RF signal are exhibited by the following formulae:

$$FES=(R+U)-(S+T)$$

$$TES=[(A1+B1+E1+F1)-(C1+D1+G1+H1)]-kt\times[(E2+F2)-(G2+H2)]$$

$$RF=A1+B1+C1+D1+E1+F1+G1+H1+I1$$

where A1, B1, C1, D1, E1, F1, G1, H1, I1, R, S, T, E, E2, F2, F2, H2 are electric signals obtained respectively from the light receiving parts a1, b1, c1, d1, e1, f1, g1, h1, ik1, jl1, r, s, t, u, e2, f2, g2, h2.

It is noted that kt is a coefficient for preventing occurrence of DC component in a focus error signal when the objective lens is displaced.

In the tacking error signal detecting method with the use of the above-mentioned formulae, the detection is made only by splitting the grating shown in FIG. 11, which is explained in the embodiment 1, that is, it can be found that this method similar to the detecting method stated in the embodiment 1. Namely, the objective lens 2 can detect a stable tracking error signal even at both inner circumferential position and outer circumferential position with the use of the grating shown in FIG. 16, even though the rotating center of the disc is not located on a straight line in the driving direction of the optical pickup device. At this time, the distance d is determined in grating areas on the grating, including tracking areas, as indicated by thick lines in FIG. 16. The grating may have a configuration as shown in FIGS. 14A to C.

[Embodiment 3]

Figure 18:
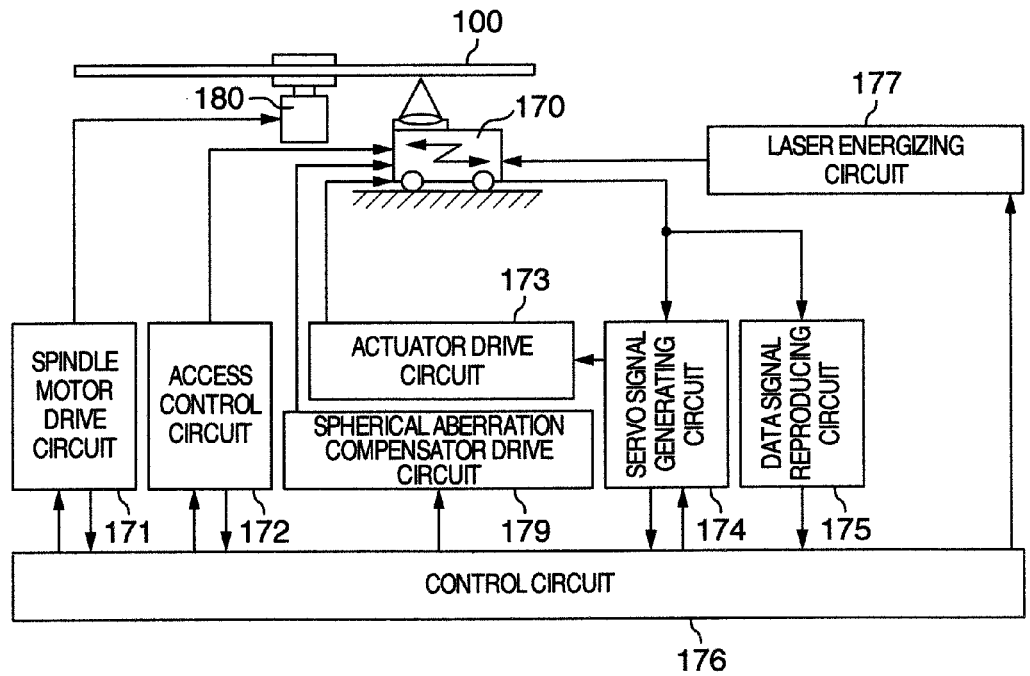
FIG. 18 is a view for explaining an optical reproducing apparatus in an embodiment 3 of the present invention.

In an embodiment 3, explanation will be hereinbelow made of an optical reproducing apparatus mounted thereon with the optical pickup device 1. FIG. 18 shows a schematic view illustrating the configuration of the optical reproducing apparatus. The optical pickup device 1 is provided therein with a mechanism which can drive the optical pickup device along a radial direction of the optical disc 100 and which is positionally controlled in response to an access control signal delivered from an access control circuit 172.

A predetermined laser drive current is fed from a laser energizing circuit 177 and into a semiconductor laser in the optical pickup device 1, and a laser beam having a predetermined light quantity which depends upon a reproduction is emitted from the semiconductor laser. It is noted that the laser energizing circuit 177 may be incorporated in the optical pickup device 1.

A signal delivered from the light detector in the optical pickup device 1, is fed into a servo signal generating circuit 174 and a data signal reproducing circuit 175. The servo signal generating circuit 174 generates servo signals including a tracking error signal and a tilt control signal, and accordingly, the actuator in the optical pickup device 1 is driven in response to these signals by means of an actuator drive circuit 173 in order to positionally control the objective lens.

The data signal reproducing circuit 175 reproduces a data signal recorded on the optical disc 100 on the basis of a signal from the light detector.

The signals obtained by the servo signal generating circuit 174 and the data signal reproducing circuit 175, as stated above, are in part delivered to a control circuit 176. The control circuit 176 is connected thereto with a spindle motor drive circuit 171, the access control circuit 176, the servo signal generating circuit 174, the laser energizing circuit 177, a spherical aberration compensator drive circuit 179 and the like so as to carry out the speed control of a spindle motor for rotating the optical disc 100, the control for an access direction and an access position, the servo control of the objective lens, the control of the light quantity of the semiconductor laser in the optical pickup device 1, and the correction for a spherical aberration caused by differences in disc substrate thickness.

[Embodiment 4]

Figure 19:
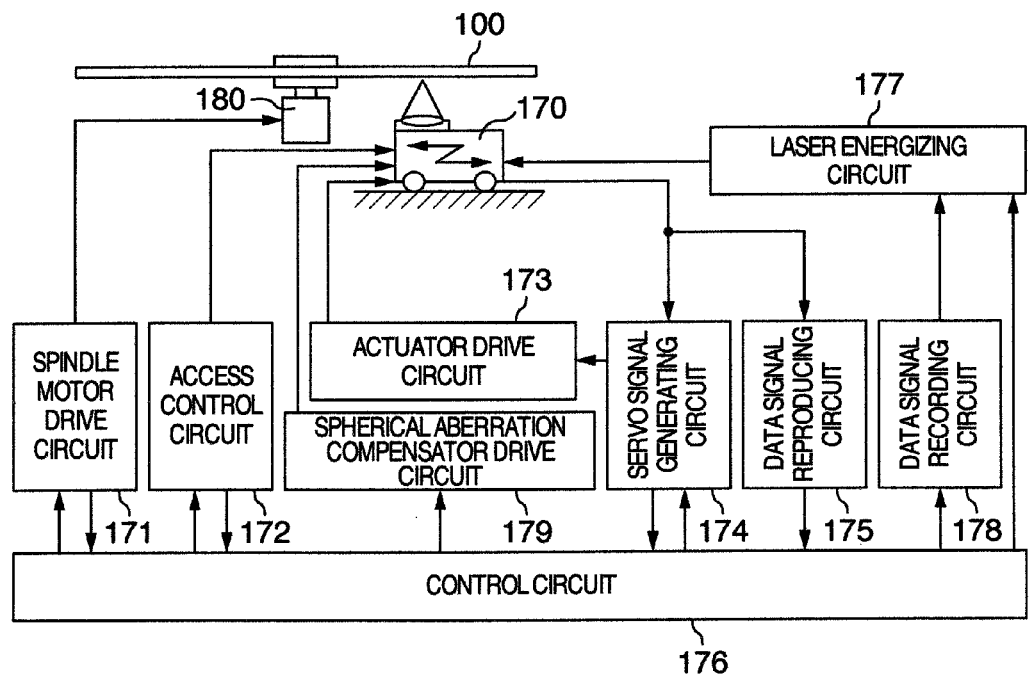
FIG. 19 is a view for explaining an optical recording and reproducing apparatus in an embodiment 4 of the present invention.

In an embodiment 4, an optical recording and reproducing apparatus incorporating the optical pickup device 1 will be explained. FIG. 19 schematically shows the optical recording and reproducing apparatus. The configuration of this apparatus is the same as that of the optical reproducing apparatus as stated above and shown in FIG. 18, except that a data signal recording circuit 178 is provided between the control circuit 176 and the laser energizing circuit 177. Thus, there is added the function that the energizing control of the laser energizing circuit 177 is carried out in accordance with a recoding control signal from the data signal recording circuit 178 in order to write desired data on the optical disc 100.

As stated above, explanation has been made of the preferred embodiments of the optical pickup device and the optical disc apparatus according to the present invention. However, the present invention should not be limited to these embodiments, but several modifications and changes can be made thereto without departing the technical concept of the present invention.

The invention claimed is:

1. An optical pickup device comprising:
   at least one semiconductor laser which emits a light beam;
   a first objective lens which focuses the light beam emitted from the at least one semiconductor laser onto a first optical disc;
   a second objective lens which focuses the light beam emitted from the at least one semiconductor laser onto a second optical disc;
   a grating which branches a light beam reflected from the second optical disc;
   an optical detector having a plurality of light receiving parts, which receives light beams branched by the grating; and
   an actuator which displaces the first and second objective lenses in a radial direction of the first optical disc and the second optical disc;
   wherein the grating has a first area on which a 0-order diffraction light beam and a +1-order diffraction light beam upon reflection at a track of the second optical disc enter, and a second area on which a 0-order diffraction light beam and a −1-order diffraction light beam upon diffraction through the track of the second optical disc enter, center parts of the first area and the second area being arranged to be spaced at a distance d in a direction perpendicular to the displacement direction; and
   wherein the distance d satisfies the following formula:

$$|D\times\sin\theta1|\geq d\geq|D\times\sin\theta2|$$

where D is an effective diameter of the light beam, θ1 is a track angle at an innermost circumference, and θ2 is a track angle at an outermost circumference of the optical disc.

2. The optical pickup device according to claim 1, wherein the first and second objective lenses are mounted in juxtaposition in a direction substantially perpendicular to the displacement direction, a center of the first objective lens being located on an axis extending from a center of the first optical disc in the displacement direction.

3. The optical pickup device according to claim 1, wherein the first area and the second area of the grating are separated from each other by a straight line passing through a center of the grating and extending in the displacement direction.

4. An optical disc apparatus comprising:
an optical pickup device according to claim 1;
a laser energizing circuit for driving the at least one semiconductor laser in the optical pickup device;
a servo signal generating circuit for producing a focus error signal and a tracking error signal with use of signals detected by the optical detector in the optical pickup device; and
a data signal producing circuit for reproducing a data signal recorded on the optical discs.

* * * * *